March 13, 1928.

B. IZZO

BAKER'S OVEN

Filed Sept. 10, 1921     3 Sheets-Sheet 1

1,662,747

Bonaventuro Izzo
INVENTOR

By Victor J. Evans
ATTORNEY

March 13, 1928.
B. IZZO
BAKER'S OVEN
Filed Sept. 10, 1921 3 Sheets-Sheet 2
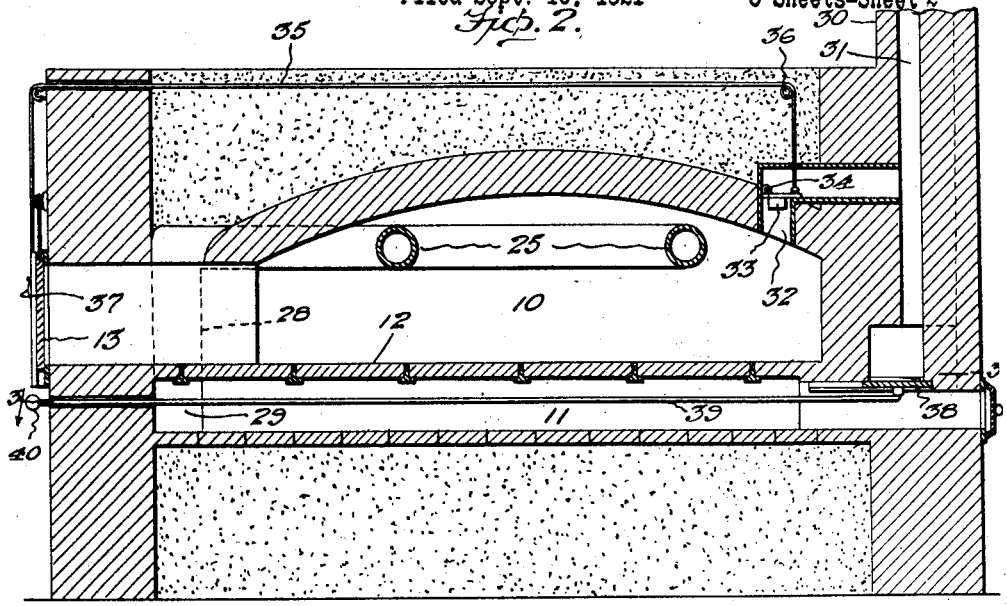
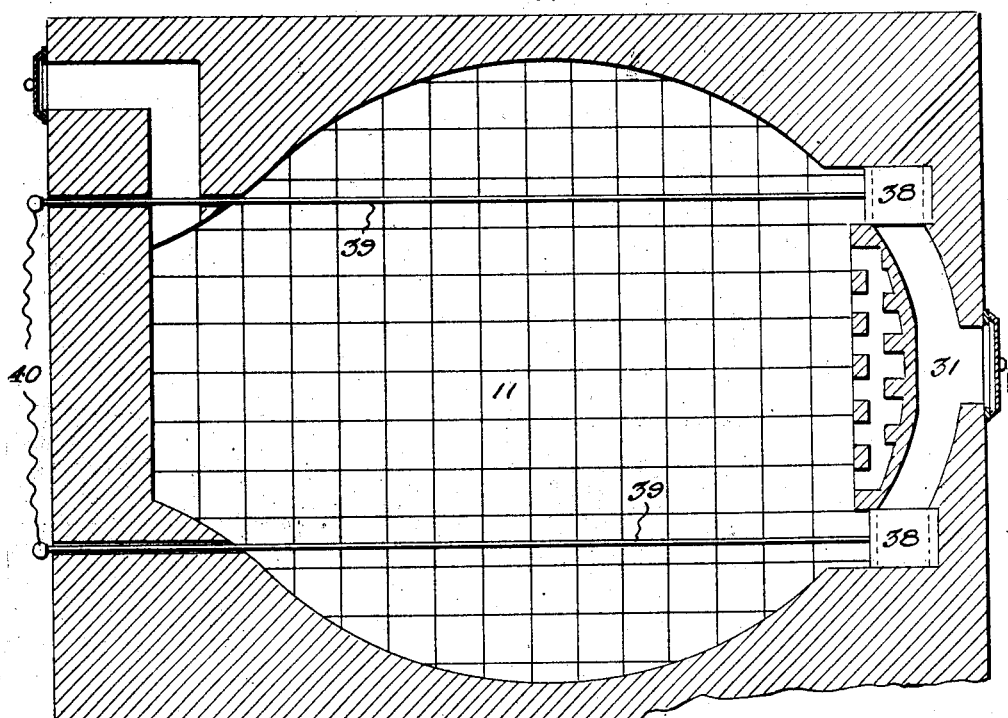
Bonaventuro Izzo, INVENTOR March 13, 1928.　　　　　　　　　　　　　　　　1,662,747
B. IZZO
BAKER'S OVEN
Filed Sept. 10, 1921　　　　　3 Sheets-Sheet 3
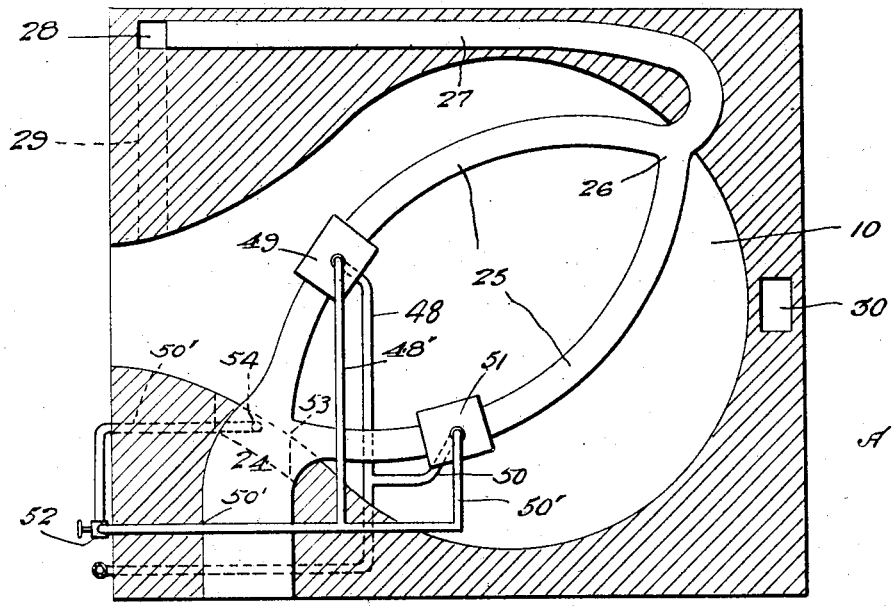
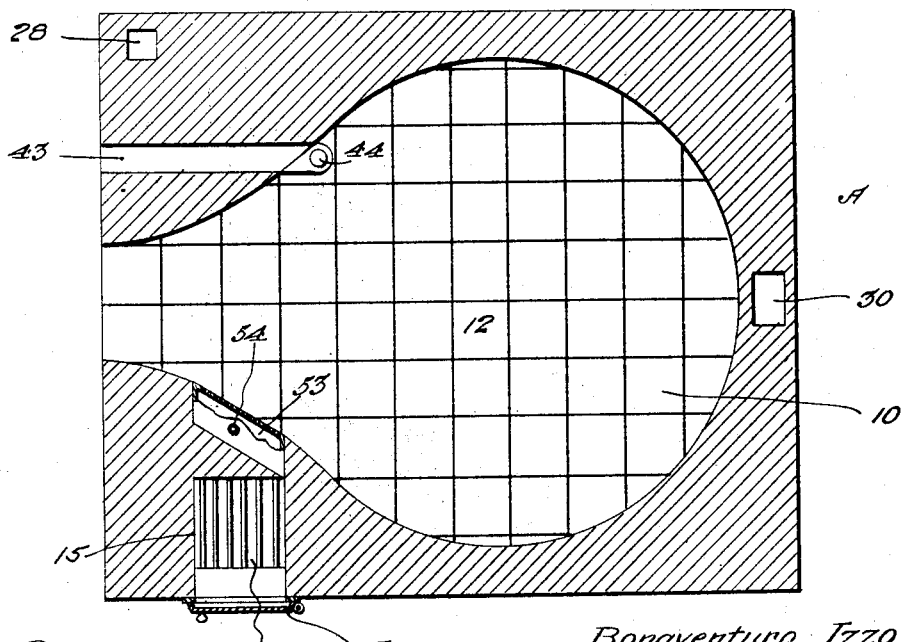
Bonaventuro Izzo INVENTOR
BY Victor J. Evans
ATTORNEY
WITNESS:

Patented Mar. 13, 1928.

1,662,747

UNITED STATES PATENT OFFICE.

BONAVENTURO IZZO, OF PATERSON, NEW JERSEY.

BAKER'S OVEN.

Application filed September 10, 1921. Serial No. 499,683.

This invention relates to baking ovens, and comprehends the construction wherein the heat is conveyed from its source to the oven chamber which is divided by a partition into upper and lower compartments, the heat being directed through a prescribed course to encircle the chamber prior to its escape through the chimney, the temperature of the chamber being regulated by means of suitably disposed dampers.

Another object of the invention resides in the novel construction of means for generating steam and conveying the latter into the oven chamber to provide the necessary moisture as the occasion requires.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 2 is a sectional view taken on line 2—2 of Figure 1.

Figure 3 is a sectional view taken on line 3—3 of Figure 2.

Figure 5 is a sectional view taken on line 5—5 of Figure 4.

Figure 6 is a sectional view taken on line 6—6 of Figure 4.

Figure 1:
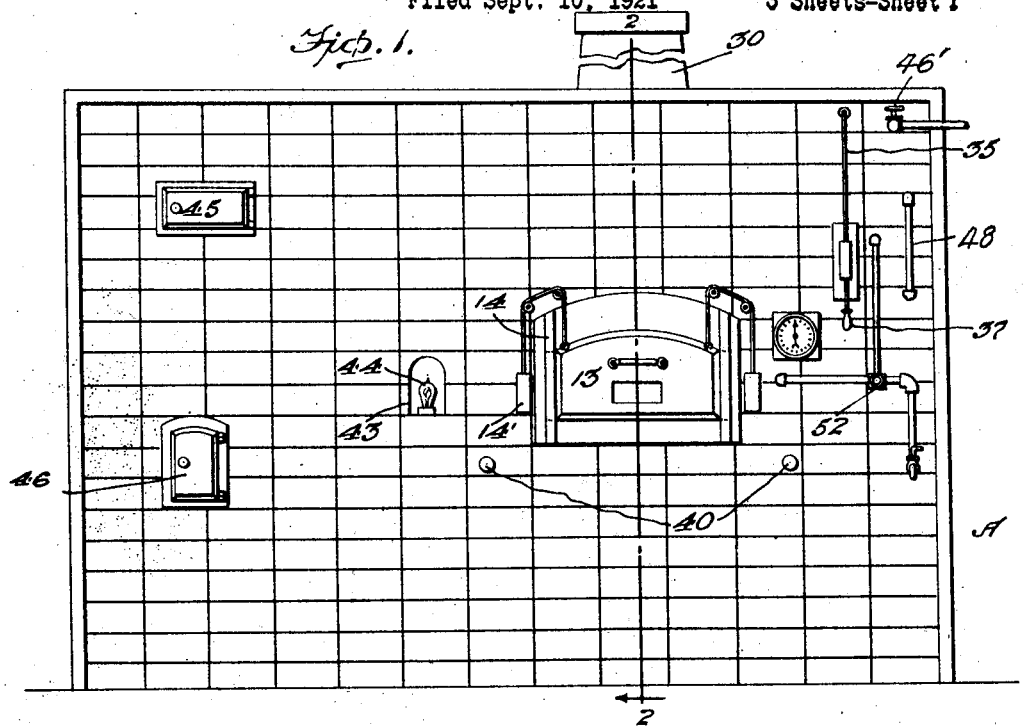
Figure 1 is a front elevation of the oven forming the subject matter of the invention.
Figure 4:
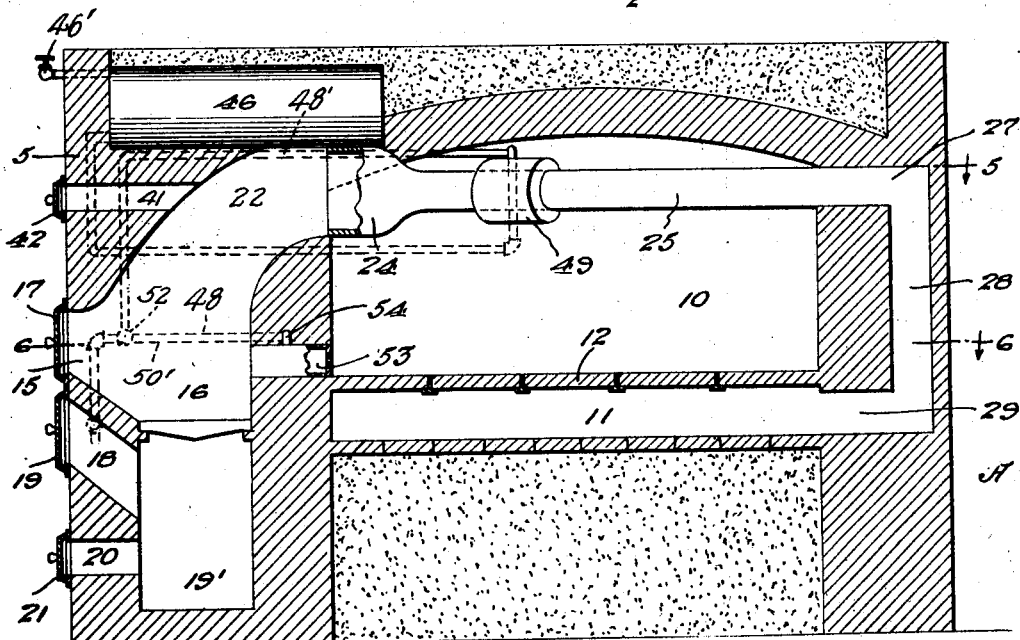
Figure 4 is a sectional view taken at right angles to Figure 2.

Referring to the drawings in detail, A indicates generally the oven which may be constructed from any suitable material and also vary in size without departing from the spirit of the invention. The oven chamber is preferably of oval contour to retain the heat, while the chamber is divided into upper and lower compartments 10 and 11 respectively by means of a partition 12, the chamber 10 being the baking chamber while the chamber 11 is the flue chamber. The front of the oven is provided with an entrance opening to the compartment 10 and is normally closed by means of a door 13 which slides in suitable guides 14, the door being equipped with counter-weights 14. One side of the oven is provided with an opening 15 through which access is had to the fire box 16, the opening 15 being normally closed by a door 17. Beneath the door 17, the oven is equipped with an opening 18 communicating with the fire box and which also is closed by means of a damper 19 of any suitable character. The ash pit is indicated at 19', and is provided with an outlet passage or opening 20 which is also closed by means of a door 21.

The fire box has an upwardly extended curved portion 22 which opens into the compartment 10 of the oven chamber. Suitably coupled to this curved portion 22 and leading therefrom into the compartment 10 is a conduit 24 which is formed to provide oppositely curved branches 25 arranged in substantially oval shape formation and which extend entirely across the compartment 10 as shown in Figure 5. These branches are joined together at a point indicated at 26, or in other words, they merge into a single conduit 27 which passes through the wall of the oven and then extends downwardly as at 28, and thence inwardly at 29 into the compartment 11 beneath the partition 12. Consequently, the heat is conveyed from the fire box through the branches 25 of the conduit, heating the compartment 10 of the baking oven, and thence passes from this compartment through the single conduit 27 to the compartment 11. In other words, the heat source is a prescribed course to completely encircle the oven chamber prior to its escape through the chimney indicated at 30. This not only provides for a quick heating of the oven chamber, but the conduits 25 radiate heat upon the top of the contents of the oven with a view of burning the contents as will be readily understood. The wall of the oven is provided with a passage 31 which communicates with the chimney 30, while both the compartments 10 and 11 of the oven chamber has valved communication with the passage 31 so that the temperature of the oven chamber can be easily regulated. For instance, leading from the compartment 10 to the passage 31 is a conduit 32, and arranged within the conduit is a weighted valve 33 pivoted as at 34, and which valve normally closes the communication between the compartment 10 and the chimney. Secured to the free end of the valve is a cable 35 which is trained over guide pulleys 36, one portion of the cable being arranged in advance of the oven and provided with a handle 37 or the like through the instrumentality of which the valve may be opened as the occasion requires. Arranged within the compartment 11 are two slide valves 38 which control communication between the compartment 11 and the passage 31. Each of the valves 38 is connected to an operating rod 39, these rods projecting through the front wall of the oven and equipped with knobs or handles 40. The oven is also provided with a passage 41 leading to passage 25 which crosses the compartment 10 to facilitate the cleaning of the passage 25, which passage is normally closed by a door 42. An additional passage 43 extends from the front of the oven into the oven chamber, and at the end of this passage is arranged a lamp 44 for illuminating the interior of the chamber. The doors 45 and 46 normally close passages leading to various parts of the oven for cleaning parts 28 and 29 which extend entirely across the compartment 10 as shown in Figure 5.

Suitably positioned within the oven is a water container 46, and leading from this container is a pipe 48 having one end communicating with a water jacket 49 surrounding one of the conduits 25, while leading from the pipe 48 is a branch 50 which communicates with a similar water jacket 51 surrounding the other conduit 25. Embedded in one wall of the oven and arranged in close proximity to the fire box thereof is a perforated receptacle 53 which communicates with the compartment 10 of the oven chamber. Extending from the top of the water jacket 51 is a pipe 50', and a pipe 48' extends from the top of the jacket 49, and said last mentioned pipe is arranged in communication with the pipe 50' which passes through said oven as clearly shown in Figures 1 and 5 of the drawing, thence said pipe 50' extends back into said oven and terminates into communication with a pipe 54. The pipe 54 terminates into communication with the perforated receptacle for supplying water and steam to the latter from the water jackets and a valve 52 is arranged in the pipe 50' for controlling the water and steam to the receptacle. The receptacle is heated from the fire box and as the water enters the same, it is generated into steam which is introduced into the compartment 10 of the oven chamber to moisten the latter as the occasion requires.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

A baking oven of the character described comprising an oven chamber, a partition dividing the chamber into upper and lower compartments, a fire box arranged at one side of said oven chamber and formed with an upwardly curved portion, said upper compartment forming the oven proper and the lower compartment being a flue compartment, a conduit having one end opening into the curved portion and being formed with oppositely curved branches connected adjacent the walls of the upper compartment in a manner to arrange said branches in a substantially oval shaped formation, an additional conduit establishing communication between the adjacent ends of the curved branches and the lower compartment, said branches merging into the last mentioned conduit, a passage-way in the back wall of the oven and arranged in communication with the atmosphere and with the upper and lower compartments respectively, oppositely disposed independently operable valves controlling the communication between the passage-way and the lower compartment, a similar controlled valve for controlling the communication between the passage-way and the upper compartment and being disposed in the upper rear portion thereof, a water jacket surrounding each of the curved branches of the conduit, means for supplying water to the jackets, means leading from said jackets and communicating with a perforated receptacle having communication with the oven compartment, and means for illuminating said last mentioned compartment.

In testimony whereof I affix my signature.

BONAVENTURO IZZO.